US 9,848,618 B2

(12) United States Patent
Conte (10) Patent No.: US 9,848,618 B2
(45) Date of Patent: Dec. 26, 2017

(54) METHOD AND MACHINE FOR PRODUCING A CONFECTIONARY PRODUCT

(71) Applicant: Tekno-Ice S.r.l., Buccinasco, Milan (IT)

(72) Inventor: Santino Claudio Conte, Milan (IT)

(73) Assignee: Tekno-Ice S.r.l., Buccinasco, Milan (IT)

( * ) Notice: Subject to any disclaimer, the term of this patent is extended or adjusted under 35 U.S.C. 154(b) by 161 days.

(21) Appl. No.: 14/416,372

(22) PCT Filed: Jul. 24, 2013

(86) PCT No.: PCT/IB2013/056057
§ 371 (c)(1),
(2) Date: Jan. 22, 2015

(87) PCT Pub. No.: WO2014/016777
PCT Pub. Date: Jan. 30, 2014

(65) Prior Publication Data
US 2015/0257408 A1    Sep. 17, 2015

(30) Foreign Application Priority Data
Jul. 26, 2012 (IT) .............................. MI2012A1309

(51) Int. Cl.
| | |
|---|---|
| A23G 3/34 | (2006.01) |
| A23G 3/02 | (2006.01) |
| A23G 9/28 | (2006.01) |
| A23G 9/26 | (2006.01) |
| A23P 30/20 | (2016.01) |

(52) U.S. Cl.
CPC ......... *A23G 3/0021* (2013.01); *A23G 3/0023* (2013.01); *A23G 3/021* (2013.01); *A23G 3/0247* (2013.01); *A23G 9/28* (2013.01); *A23G 9/285* (2013.01); *A23G 9/26* (2013.01); *A23P 30/20* (2016.08)

(58) Field of Classification Search
CPC ........ A23P 10/10; A23P 30/20; A23G 3/0002; A23G 3/0004; A23G 3/0046; A23G 3/0048; A23G 3/02; A23G 3/0242; A23G 3/34; A23G 9/00; A23G 9/26; A23G 9/28; A23G 9/281; A23G 9/285; A23G 9/286; A23G 9/04; A23G 9/14; A23G 9/16; A23G 9/163; A23G 9/166; A23G 9/18
USPC ...................... 99/452, 460, 461, 462; 62/380
See application file for complete search history.

(56) References Cited

U.S. PATENT DOCUMENTS 3,257,041 A * 6/1966 Jernigan ................ A23G 9/245
222/333
3,280,763 A    10/1966 Komberec
(Continued)

FOREIGN PATENT DOCUMENTS

EP    1 769 684 A2    4/2007

*Primary Examiner* — Drew Becker
*Assistant Examiner* — Bryan Kim
(74) *Attorney, Agent, or Firm* — Blank Rome LLP (57) ABSTRACT

A method for producing a confectionary product (1), comprises the steps of extruding a confectionary substance to form a confectionary string, shearing an end portion (5) from a remaining part (7) of the confectionary string (2), resting the end portion (5) on a conveying surface (8) already before the separation of the end portion (5) and completing the separation of the end portion (5) from the remaining part (7) of the confectionary string (2) while the end portion (5) is resting on the conveying surface (8).

6 Claims, 9 Drawing Sheets

(56) References Cited

U.S. PATENT DOCUMENTS

| | | | |
|---|---|---|---|
| 3,385,234 A | | 5/1968 | Anderson |
| 4,447,458 A | * | 5/1984 | Roth .................... A23G 3/2076 |
| | | | 366/154.2 |
| 4,795,652 A | * | 1/1989 | Cooper .................... A21B 5/06 |
| | | | 426/138 |
| 4,851,247 A | | 7/1989 | Greenhouse et al. |
| 4,925,689 A | * | 5/1990 | Getman ............... A23G 3/2015 |
| | | | 425/131.1 |
| 4,948,661 A | * | 8/1990 | Smith .................... B29C 70/467 |
| | | | 156/182 |
| 5,378,483 A | * | 1/1995 | Fazio ....................... A23G 9/24 |
| | | | 426/101 |
| 5,454,232 A | * | 10/1995 | Lermuzeaux ........... A23L 3/375 |
| | | | 62/374 |
| 6,663,374 B1 | * | 12/2003 | Marable ............... A23G 3/2015 |
| | | | 425/131.1 |
| 7,097,798 B2 | * | 8/2006 | Ishii ........................ B26D 1/46 |
| | | | 264/150 |
| 7,914,119 B2 | * | 3/2011 | Silverbrook ............... B41J 2/16 |
| | | | 347/47 |
| 2004/0187708 A1 | * | 9/2004 | Waldstrom ............... A23G 9/28 |
| | | | 99/455 |
| 2006/0101956 A1 | * | 5/2006 | Hermansen ........... A23G 9/285 |
| | | | 83/13 |
| 2009/0081342 A1 | * | 3/2009 | Jarvis .................... A23G 9/083 |
| | | | 426/302 |
| 2013/0084373 A1 | * | 4/2013 | Linck ..................... F25D 25/04 |
| | | | 426/305 |

* cited by examiner

METHOD AND MACHINE FOR PRODUCING A CONFECTIONARY PRODUCT

The object of the present invention is a method for producing a confectionary product by extrusion through an extruder nozzle, in which cutting means are moved in a direction transverse to the extrusion direction to separate the end portion from the remaining part of the extruded confectionary (the so-called "confectionary string") and thus form the confectionary product.

The invention also relates to a machine for producing a confectionary product by extrusion, which machine comprises an extruder nozzle with a nozzle orifice, cutting means movable in a direction transverse to the extrusion direction to separate the end portion from the remaining part of the extruded confectionary and thus form the confectionary product.

The invention relates in particular to the production of confectionary products in the form of ice cream, but it is also usable for the production of other continuous string extruded products, irrespective of whether they are or are not provided with a stick, such as lollipops. However, the problems at the basis of the invention and the advantages achieved through the invention will be described with specific reference to the production of ice cream products.

It is known to produce ice lollies or ice cream by extrusion with a wide freedom of choice of the shape viewed in the extrusion direction and with the possibility of combining different colours and substances, such as ice cream and ice lollies. Moreover, the extruded ice cream products may be provided with or without a stick inserted.

It is therefore possible to extrude the confectionary products in a vertical direction directly above horizontal support surfaces, in particular a series of support trays or a conveyor belt, on which the product sheared from the string is then put (i.e., rested) for further treatments, e.g. for freezing, coating, etc.

In the case of cuts perpendicular to the extrusion direction, the resulting confectionary product will have a shape delimited between the two parallel cutting sides. Because of the impact of the cutting means, e.g. stretched wires or blades, against the string, the sheared confectionary product is "launched" on the conveying surface in a hardly controllable manner. This leads to unwanted variations in the product shape and to inaccurate placement thereof on the conveying surface, which cause complications in the later treatment steps.

The above drawbacks are particularly accentuated in the presence of macro-particles, such as grains of chocolate or nuts, brittle, dried fruit, etc., inside the confectionary string. In fact, the difficulty or impossibility of cutting through the macro-particles in the cutting plane leads to a flattening of the macro-particles through the soft confectionary substance and increases the product deformation and the errors of positioning on the conveying surface.

To date, the need for newer and newer ice cream products with ingredients having different shape and texture, e.g. different kinds of nuts, chocolate, sweets, fruit etc., is not compatible with the needs of a production made by means of automated extrusion.

The object of the present invention therefore is to propose a method and a machine for producing products by extrusion and shearing of the confectionary string, having such features as to overcome at least some of the drawbacks of the prior art.

A particular object of the invention is to propose a method and a machine for producing confectionary products by extrusion and shearing of the confectionary string, having such features as to reconcile the need to extrude a confectionary substance containing cut-resistant macro-particles with the need to achieve a high shape uniformity of the products sheared from the string and a precise positioning of the products on the conveying surface.

These and other objects are achieved by a method for producing a confectionary product, comprising the steps of:
forming a confectionary string through the extrusion of a confectionary substance through an extruder nozzle in an extrusion direction,
forming the confectionary product by moving the cutting means in a direction transverse to the extrusion direction from a rest position outside the confectionary string to a cutting position inside the confectionary string in such a way as to separate an end portion from a remaining part of the confectionary string emerging from the extruder nozzle,
moving the confectionary product away from the extruder nozzle by resting the end portion separated from the confectionary string on a conveying surface and moving the conveying surface in a transport direction transverse to the extrusion direction, characterized by the steps of:
resting the end portion on the conveying surface already before the separation of the end portion from the remaining part of the confectionary string, and
completing the separation of the end portion from the remaining part of the confectionary string while the end portion is resting on the conveying surface.

Resting the end portion of the confectionary string on the conveying surface already during the cutting is a further constraint which remarkably reduces the unwanted deformations and the positioning inaccuracies of the confectionary product due to the impact of the cutting means onto the confectionary string.

Likewise, the objects of the invention are achieved by a machine for producing a confectionary product, comprising:
an extruder nozzle configured to extrude a confectionary substance in an extrusion direction, thus forming a confectionary string,
cutting means configured to be moved in a cutting direction transverse to the extrusion direction from a rest position outside the confectionary string to a cutting position inside the confectionary string in such a way as to separate an end portion from a remaining part of the confectionary string emerging from the extruder nozzle and thus form the confectionary product,
a conveying surface suitable for receiving the end portion separated from the confectionary string and configured to be moved in a transport direction transverse to the extrusion direction for moving the confectionary product away from the extruder nozzle,
the machine being configured in such a way as to:
rest the end portion of the conveying surface already before the separation of the end portion from the remaining part of the confectionary string emerging from the extruder nozzle, and
complete the separation of the end portion from the remaining part of the confectionary string while the end portion is resting on the conveying surface.

To better understand the invention and appreciate the advantages thereof, some exemplary non-limiting embodiments thereof will now be described with reference to the accompanying figures, in which.

To facilitate understanding of the following description, a scheme is included below which defines the terms used to describe the movements of some functional entities both for the method and for the machine object of the invention.

Conveying Surface 8:
conveying movement 20 in a transport direction 9.

Extruder Nozzle 3:
forming of the confectionary string 2 along an extrusion direction 4 and in an extrusion way,
follow-through movement 16 in a follow-through direction 17 between an initial position and a final position of the extruder nozzle 3,
lifting movement 18 in a lifting direction 11 between a lower position and an upper position of the extruder nozzle 3

Cutting Means 6:
cutting displacement 12 in a cutting direction 13 between a rest position and a cutting position of the cutting means 6,
detachment displacement 14 in a detachment direction 15 between a lowered position and a raised position of the cutting means 6.

Figure 1:
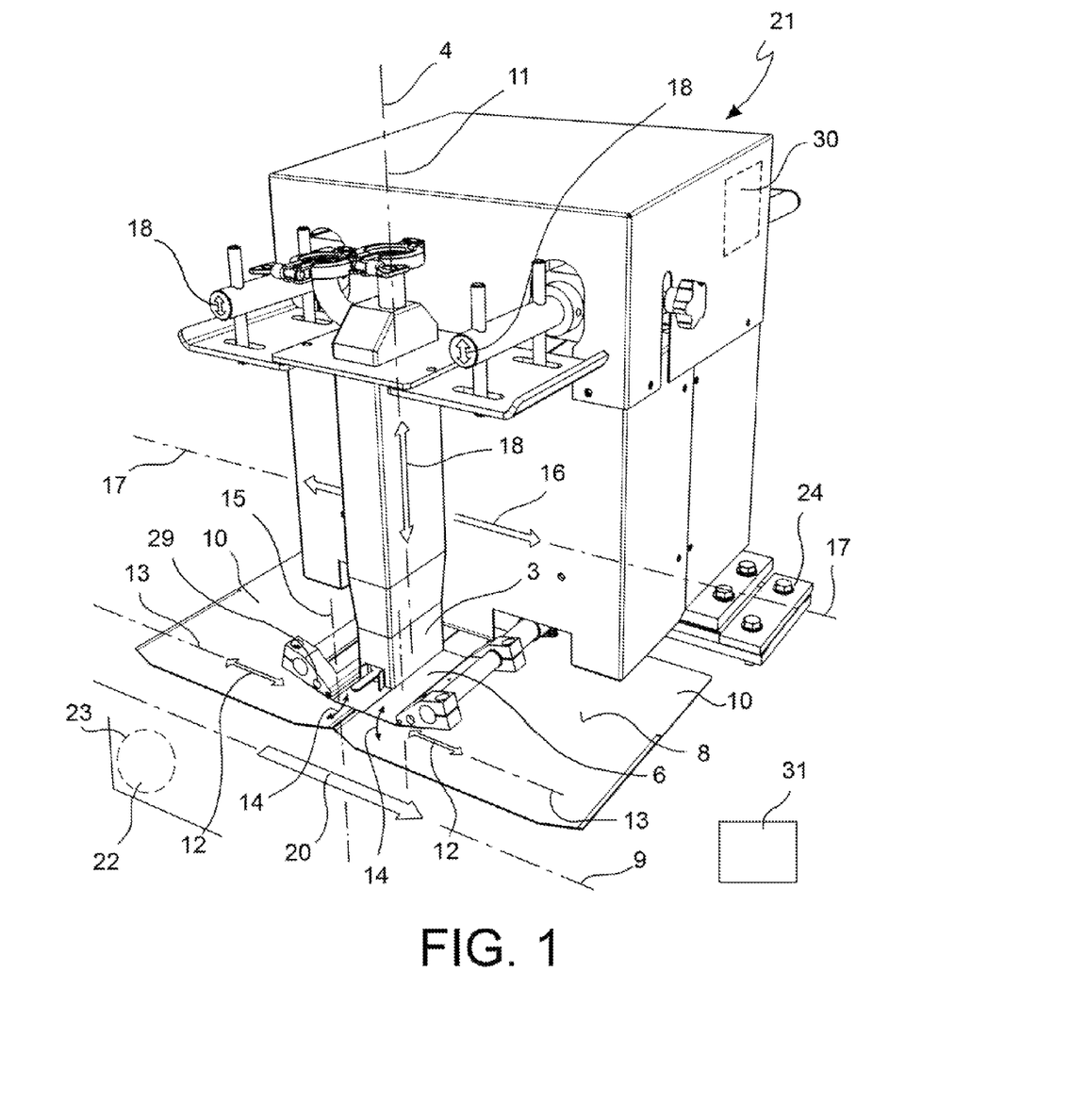
FIG. 1 is an axonometric view of a machine for producing a confectionary product according to an embodiment of the invention.
Figure 2A:
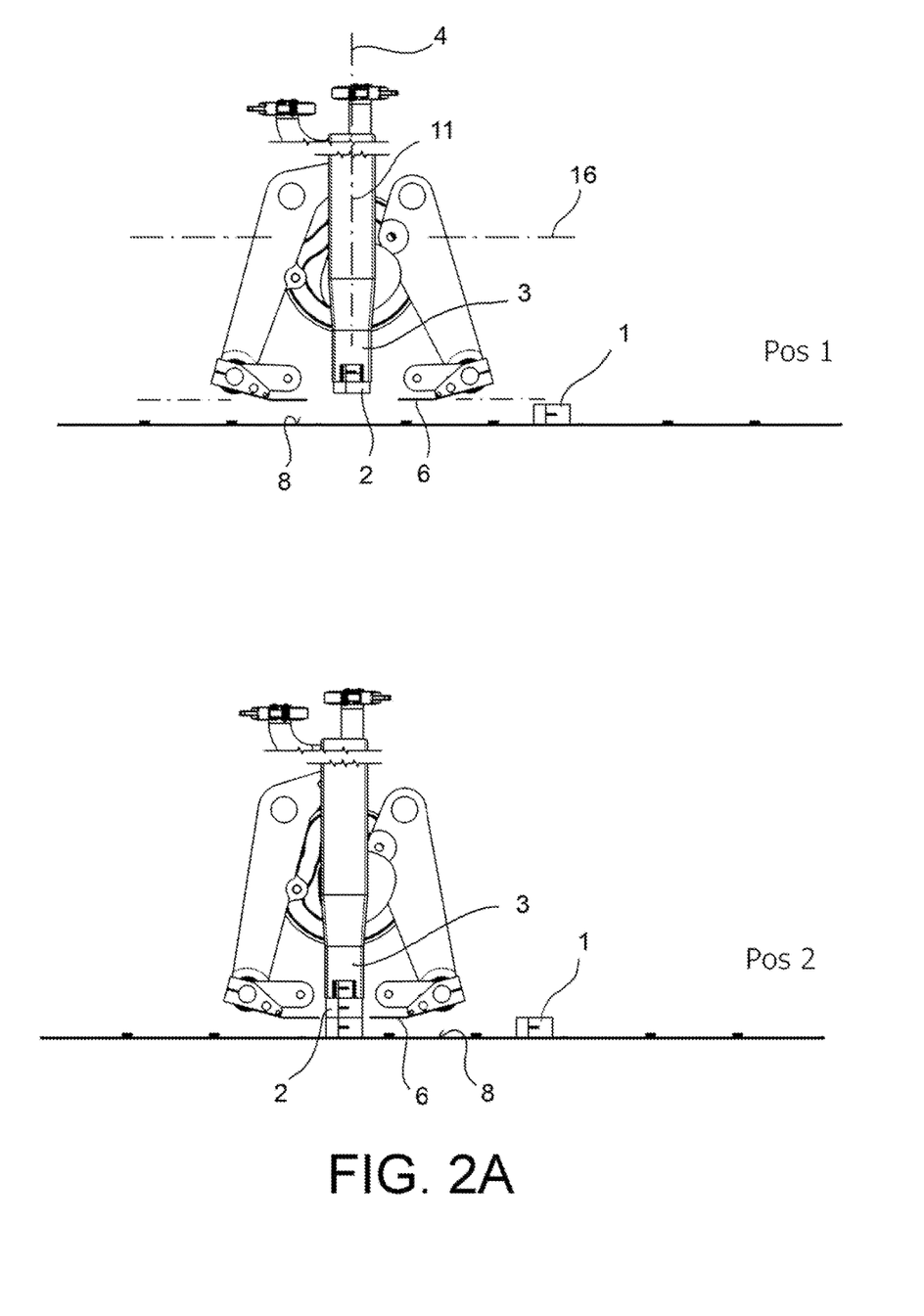
FIG. 2 shows a sequence of steps of a method for producing a confectionary product according to an embodiment, implemented by the machine in FIG. 1.
Figure 2B:
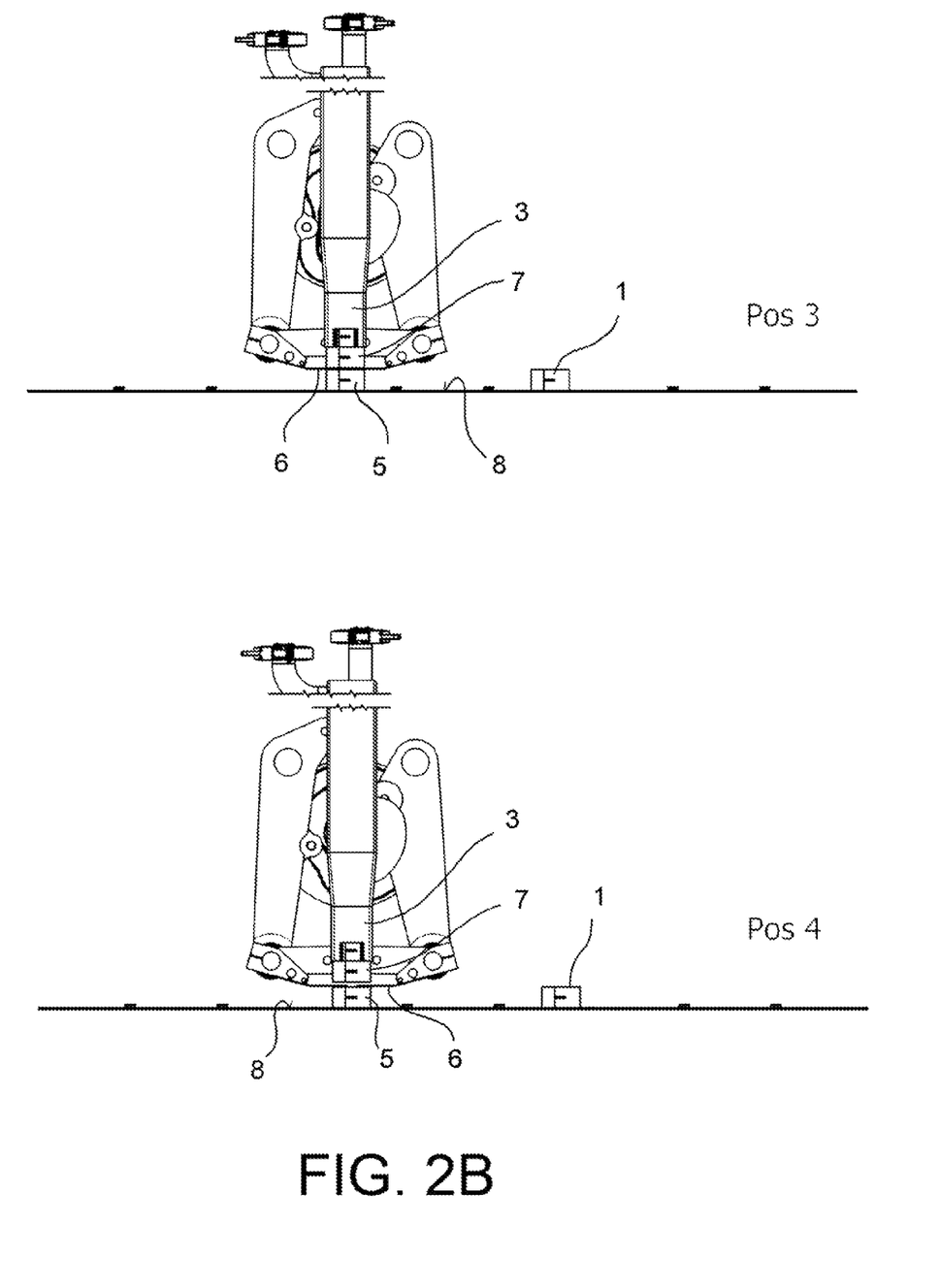
Figure 2C:
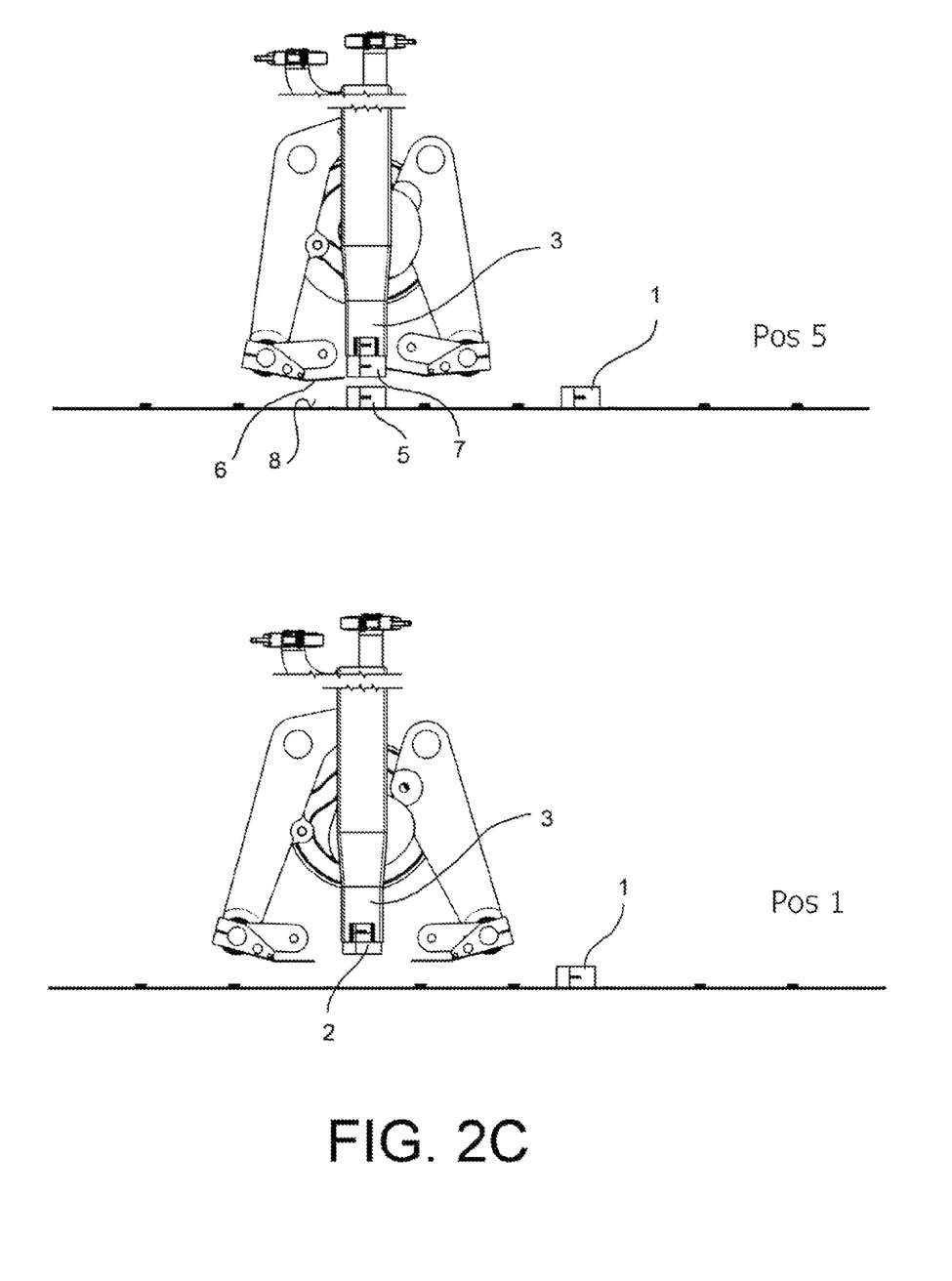
Figure 3:
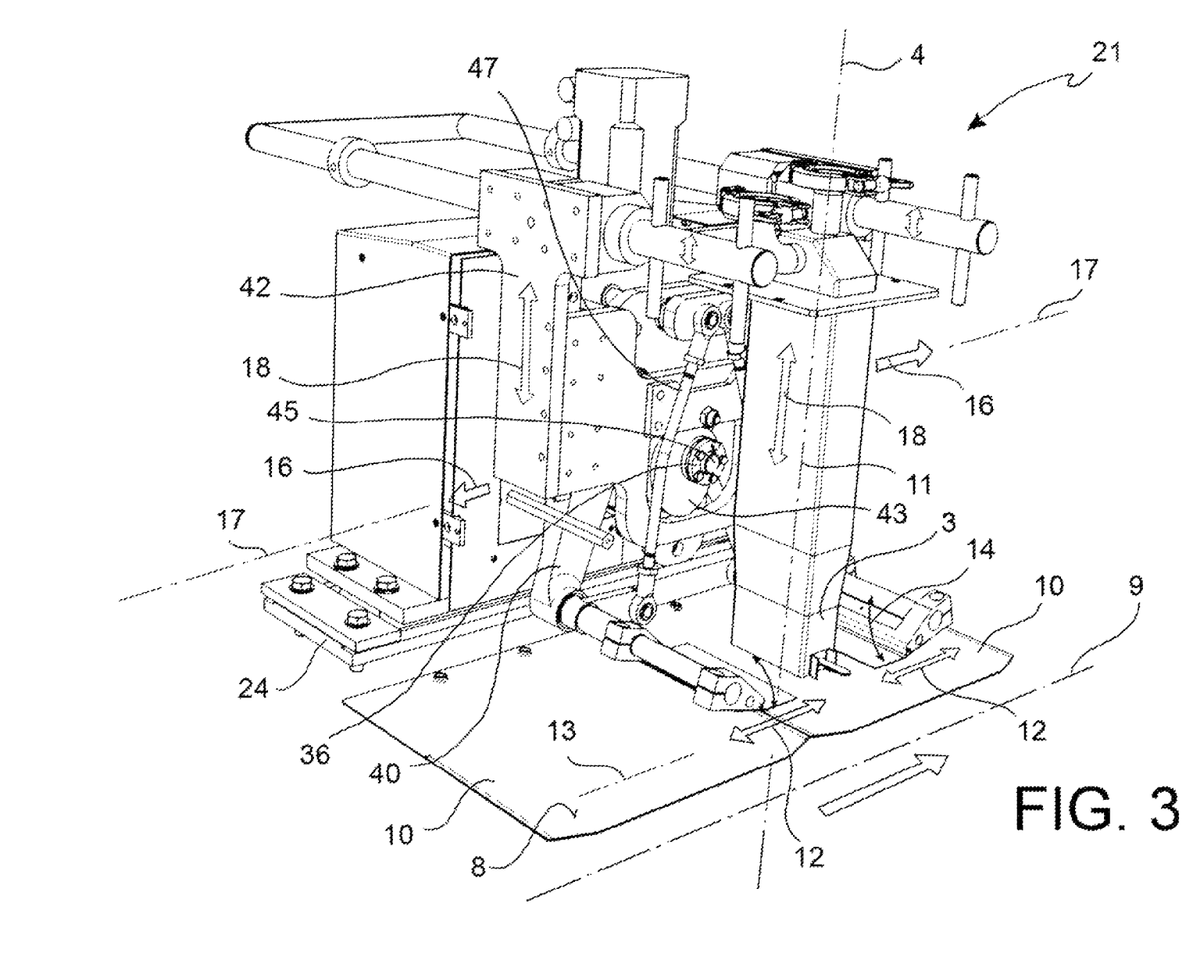
FIG. 3 is a front axonometric view of the machine in FIG. 1, in which a housing and some other components have been removed to facilitate understanding.

With reference to the figures, a method for producing a confectionary product 1 comprises the steps of:

forming a confectionary string 2 by extrusion of a confectionary substance through an extruder nozzle 3 in an extrusion direction 4 (FIG. 2 steps POS1 and POS2), forming the confectionary product 1 by moving the cutting means 6 in a cutting direction transverse to the extrusion direction 4 from a rest position outside the confectionary string 2 to a cutting position inside the confectionary string 2 so as to separate by cutting an end portion 5 from a remaining part 7 of the confectionary string 2 coming out of the extruder nozzle 3 (FIG. 2 step POS3), moving the confectionary product 1 away from the extruder nozzle 3 by resting the end portion 5 separated from the confectionary string 2 on a conveying surface 8 and moving the conveying surface 8 in transport direction 9 transverse to the extrusion direction 4 (FIG. 2 steps POS5 and POS1), resting the end portion 5 on the conveying surface 8 already before the separation of the end portion 5 from the remaining part 7 of the confectionary string 2 and completing the separation of the end portion 5 from the remaining part 7 of the confectionary string 2 while the end portion 5 is resting on the conveying surface 8 (FIG. 2 steps POS2 and POS3).

Thanks to the support of the end portion 5 of the confectionary string 2 on the conveying surface 8, the end portion 5 is constrained during cutting, thus obviating any deformation and wrong positioning of the confectionary product 1 due to the impact of the cutting means 6.

According to an embodiment (FIG. 2 steps POS2 to POS5), the end portion 5 of the confectionary string 2 is rested on the conveying surface 8 already before cutting, i.e. before the cutting means 6 (e.g. one or more blades or one or more stretched wires) penetrate into the confectionary string 2, and the end portion 5 remains resting on the conveying surface 8 during the whole cutting operation and up to a complete separation of the cutting means from the end portion 5.

By resting the end portion 5 of the confectionary string 2 on the conveying surface already before starting the cut, an accurate positioning of the confectionary product 1 is obtained, completely independent of the cutting action and, therefore, suitable for subsequent automated treatment steps (coating, pick up and orientation, packaging, etc.).

Of course, thanks to the constraint of the end portion 5 to the conveying surface 8 throughout the cutting step, the confectionary product 1 is also less subject to deformation due to the shock effect of the cutting means.

According to an embodiment, the end portion 5 of the confectionary string 2 is integrally and rigidly fixed to the conveying surface 8 by freezing the end portion 5 in at least one zone of contact with the conveying surface 8. The rigid fixing by freezing is carried out at least before the completion of the separation of the end portion 5 from the remaining part 7 of the confectionary string 2 and preferably already before starting the cut.

According to an embodiment, the rigid fixing by freezing can for example be achieved by cooling the conveying surface 8 (for example, in a temperature range from −20° C. ... −30° C.) and/or by cooling the ambient air surrounding the conveying surface 8 (for example, in a temperature range from −35° C. ... −45° C.).

According to an embodiment, after the separation of the end portion 5 from the remaining part 7 of the confectionary string 21, the extruder nozzle 3 is moved away from the confectionary product 1 formed (and preferably also from the cutting means 6) by a lifting movement 18 of the extruder nozzle 3 from a lower position (FIG. 2 steps POS1-POS3) to an upper position (FIG. 2 step POS5) along a lifting direction 11 parallel to the extrusion direction 4 but in a way opposite to the extrusion way and away from the conveying surface 8.

This creates an interstice space between (in particular beneath) a free end of the remaining part 7 of the confectionary string 2 coming out of the extruder nozzle 3 and the formed confectionary product 1 (and preferably also a free space above the cutting means 6).

Such free interstice space (FIG. 2, step POS4) allows a continuation of the extrusion during the cutting step and during the removal of the confectionary product 1 without interference of the confectionary product 1 formed (and the cutting means 6) with the remaining part 7 of the confectionary string 2.

According to a further embodiment, after the separation of the end portion 5 from the remaining part 7 of the confectionary string 2, the cutting means 6 are moved away from the formed confectionary product 1 by:

a cutting back-movement 12 in the cutting direction 13 transverse to the extrusion direction 4 from the cutting position (inside the confectionary string 2) to the rest position (outside the confectionary string 2) and a detachment movement 14 in a detachment direction 15 from a lowered position (FIG. 2 step POS3) to a raised position (FIG. 2 step POS5) along a detachment direction 15 in a way opposite to the extrusion way and away from the conveying surface 8.

This spaces apart the cutting means 6 from the extrusion trajectory of the confectionary string 2 and creates (below the cutting means 6) a free interstice space which allows the removal of the confectionary product 1 in the transport direction without interfering with the cutting means 6 (FIG. 2, step POS5).

According to a further embodiment (FIG. 2, steps POS1 to POS5), during the forming of the confectionary string 2 and during the cut, the conveying surface 8 is moved (e.g., in a continuous manner) in the transport direction 9 and, at least since when the end portion 5 of the confectionary product 2 is rested up to the completion of the separation of the end portion 5 from the remaining part 7 of the confectionary string 21, the extruder nozzle 3 is moved (along with the cutting means 6) with a follow-through movement 16 from an initial position (FIG. 2, step POS1) to a final position (FIG. 2, step POS5) in a follow-through direction 17 parallel to the transport direction 9 in a manner synchronized with the transport movement 20 of the conveying surface 8, so as to minimise or reduce to zero relative movement, transverse to the extrusion direction 4, between the extruder nozzle 3 and the conveying surface 8. This obviates any deformations or wrong positioning of the confectionary product 1 due to relative displacements of the constraint points of the confectionary string 2.

At the end of the cycle (FIG. 2, step POS5), i.e. after moving away the extruder nozzle 3 from the confectionary product 1 (extruder nozzle 3 in final position and in upper position) and after moving away the cutting means 6 from the confectionary product 1 (cutting means 6 in rest position and in raised position), the extruder nozzle 3 is moved from the upper position to the lower position and the cutting means 6 are moved from the raised position to the lowered position but they remain in the rest position (FIG. 2, step POS5) so as to be ready for the next cycle of the production process. Moreover, the extruder nozzle 3 is returned together with the cutting means 6 from the final position to the initial position.

According to a preferred embodiment, the extrusion direction 4 is substantially vertical and the extrusion way is downwards, i.e. in the gravity direction. The conveying surface 8 is substantially horizontal and orthogonal to the extrusion direction 4 and extended below the extruder nozzle 3. The conveying direction 9 is substantially horizontal, at least in the zone where forming and cutting the confectionary string 2 are carried out. The cutting direction 13 and a cutting plane defined by the cutting displacement 12 of the cutting means 6 are substantially perpendicular to the extrusion direction 4, preferably horizontal and parallel to the conveying surface 8 in the zone of forming and cutting the confectionary string 2.

The process is advantageously carried out by using a machine 21 for producing a confectionary product 1, comprising:

an extruder nozzle 3 configured to extrude a confectionary substance in an extrusion direction 4, thus forming a confectionary string 2, cutting means 6 configured to be moved in the cutting direction 13 transverse to the extrusion direction 4 from a rest position outside the confectionary string in a cutting position inside the confectionary string 2 so as to separate an end portion 5 from a remaining part 7 of the confectionary string 2 coming out from the extruder nozzle 3 and thus form the confectionary product 1, a conveying surface 8 suitable for resting the end portion 5 separated from the confectionary string 2 and configured to be moved in a transport direction 9 transverse to the extrusion direction 4 to move the confectionary product 1 away from the extruder nozzle 3, the machine 21 being configured for:

resting the end portion 5 on the conveying surface 8 already before the separation of the end portion 5 from the remaining part of the confectionary string 2, completing the separation of the end portion 5 from the remaining part 7 of the confectionary string 2 while the end portion 5 is resting on the conveying surface 8.

According to an embodiment, the machine 21 comprises a conveyor 22 with the conveying surface 8, for example formed by a sequence of support trays 10 or by a conveyor belt, and conveyor driving means 23, for example an electric motor, to move the conveying surface 8 in the transport direction 9. The machine 21 further comprises:

a support structure 24 to which the extruder nozzle 3 and the cutting means 6 are connected, cutting driving means 25 connected to the support structure 24 and configured to move the cutting means 6, for example a pair of opposite blades, or one or more stretched wires, in the cutting direction 13, as specified above in relation to both the machine and the method, detachment driving means 26 connected to the support structure 24 and configured to move the cutting means 6 in the detachment direction 15, as specified above in relation to the method, follow-through driving means 27 connected to the support structure 24 and configured for moving the extruder nozzle 3 together with the cutting means 6 in the follow-through direction 17, as specified above in relation to the method, lifting driving means 28 connected to the support structure 24 and configured to move the extruder nozzle 3 in the lifting direction 11, as specified above in relation to the method.

The cutting driving means 25, the detachment driving means 26, the follow-through driving means 27 and the lifting driving means 28 are controlled based on the operation of the extruder nozzle 3, i.e., the forming and advancing speed of the confectionary string 2 in the extrusion direction 4, and the transport movement speed 20 of the conveying surface 8, for example by means of an electronic control unit 30 and, preferably, through a synchronization of the follow-through movement 16, of the lifting movement 18 and of the cutting displacement 12 via a mechanical coupling 45 between the cutting driving means 25, the matching driving means 27 and the lifting driving means 28.

Figure 4:
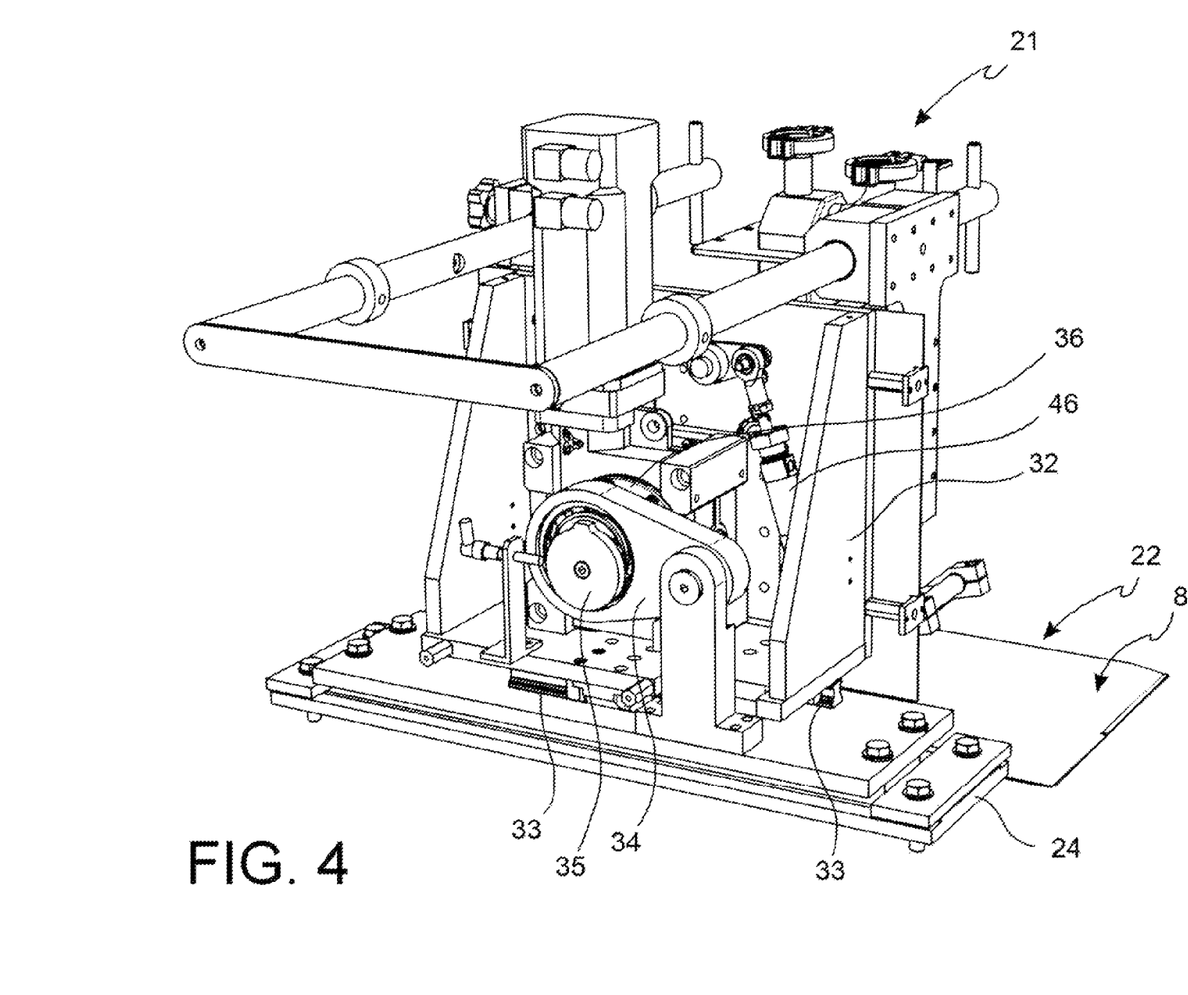
FIG. 4 is an axonometric rear view of the machine in FIG. 1, in which a housing and some other components have been removed to facilitate understanding.
Figure 5A:
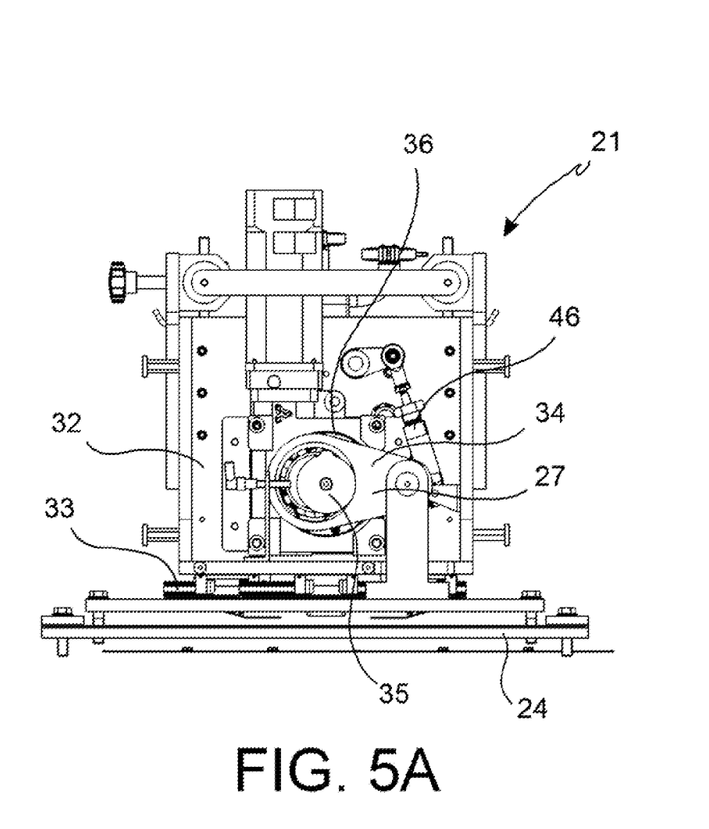
FIGS. 5A and 5B show the machine in FIG. 4 during two different operating steps.
Figure 5B:
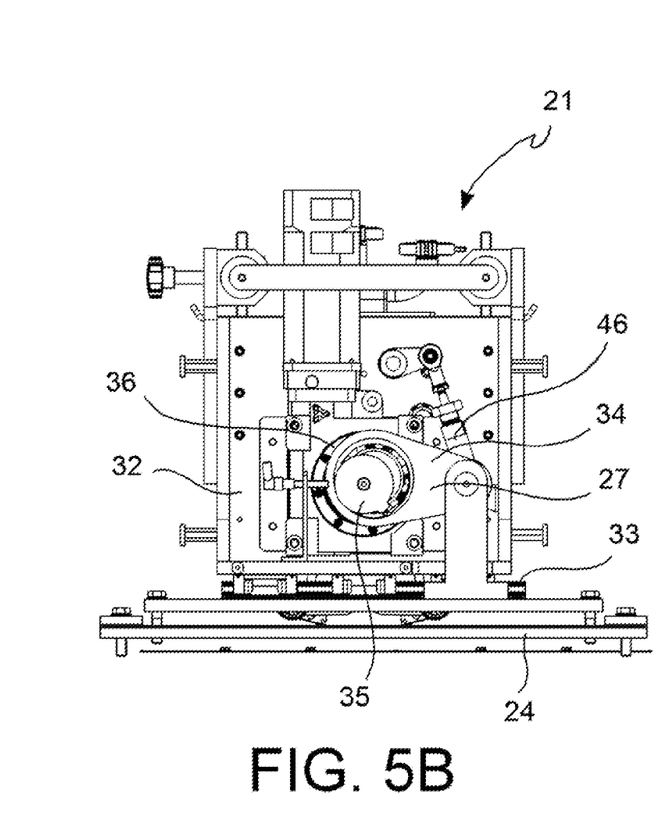

According to an embodiment (FIGS. 4, 5A, 5B), the follow-through driving means 27 may include a follow-through carriage 32 slidingly supported on horizontal follow-through rails 33 of the support structure 24 and alternatingly movable along the follow-through rails 33 by means of a connecting rod 34 and crank 35 mechanism connected between the support structure 24 and a shaft of a driving motor 36 on board the follow-through carriage 32. The extruder nozzle 3 and the cutting means 6 are connected to the follow-through carriage 32 to move along with it.

Figure 7A:
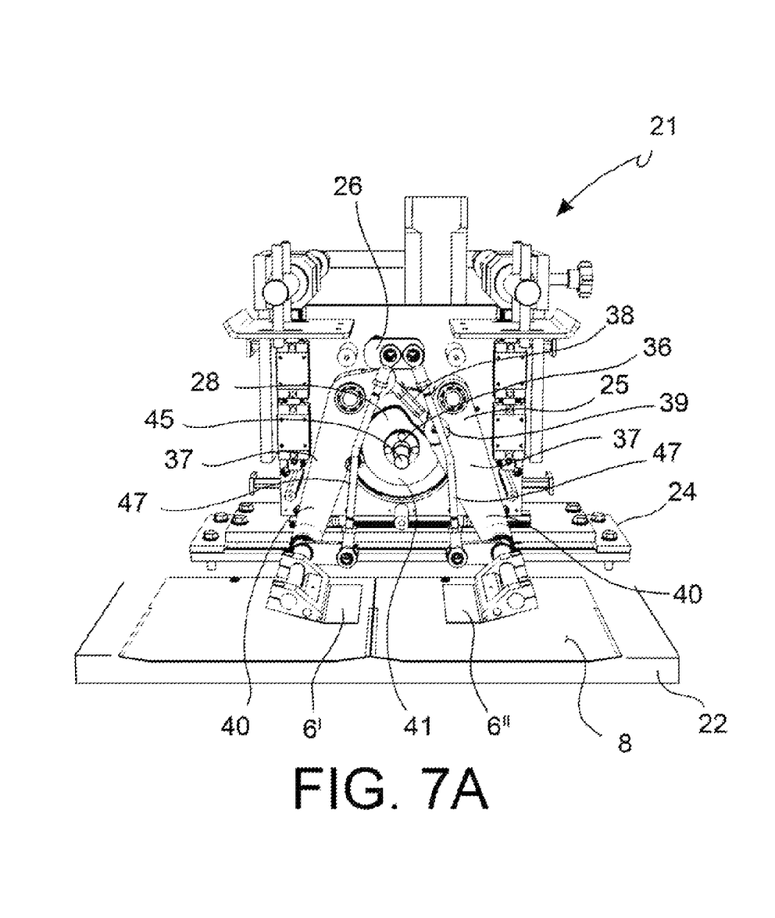
FIGS. 7A and 7B show the machine in FIG. 3 during two different operating steps.
Figure 7B:
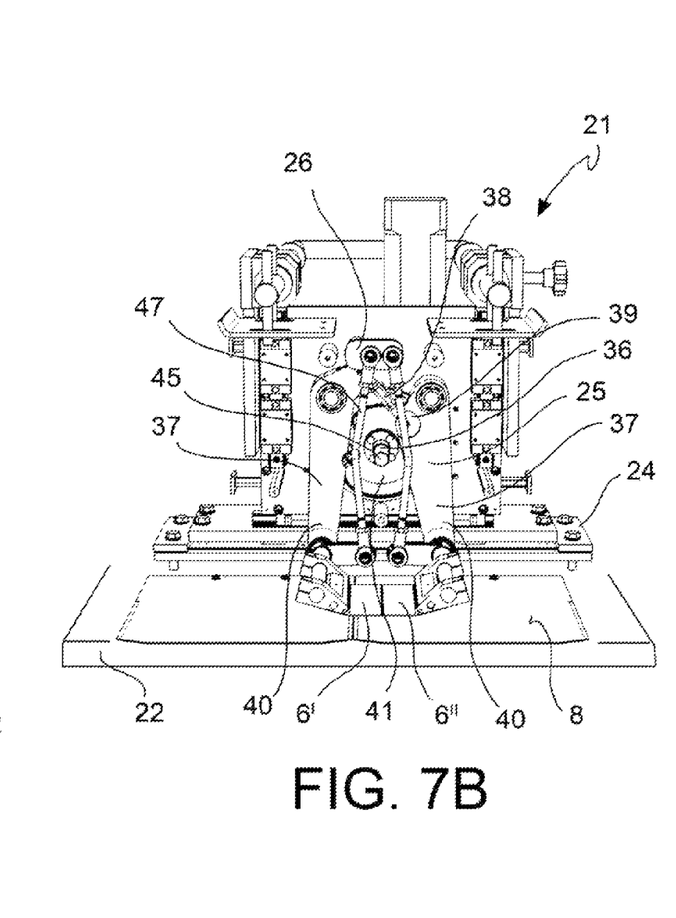

The cutting driving means 25 (FIGS. 7A, 7B) may include a mechanism with two levers 37 connected to each other by a connecting rod 38 and hinged to the follow-through carriage 32 at points spaced apart from one another and from the fulcrums of the connecting rod 38. A first cam 41 connected to the shaft of the driving motor 36 engages a cam-follower portion 39 of one of levers 37 in such a way as to generate an alternating motion towards and away from the free ends 40 of levers 37 to which blades 6', 6" for cutting the string are connected.

Figure 6A:
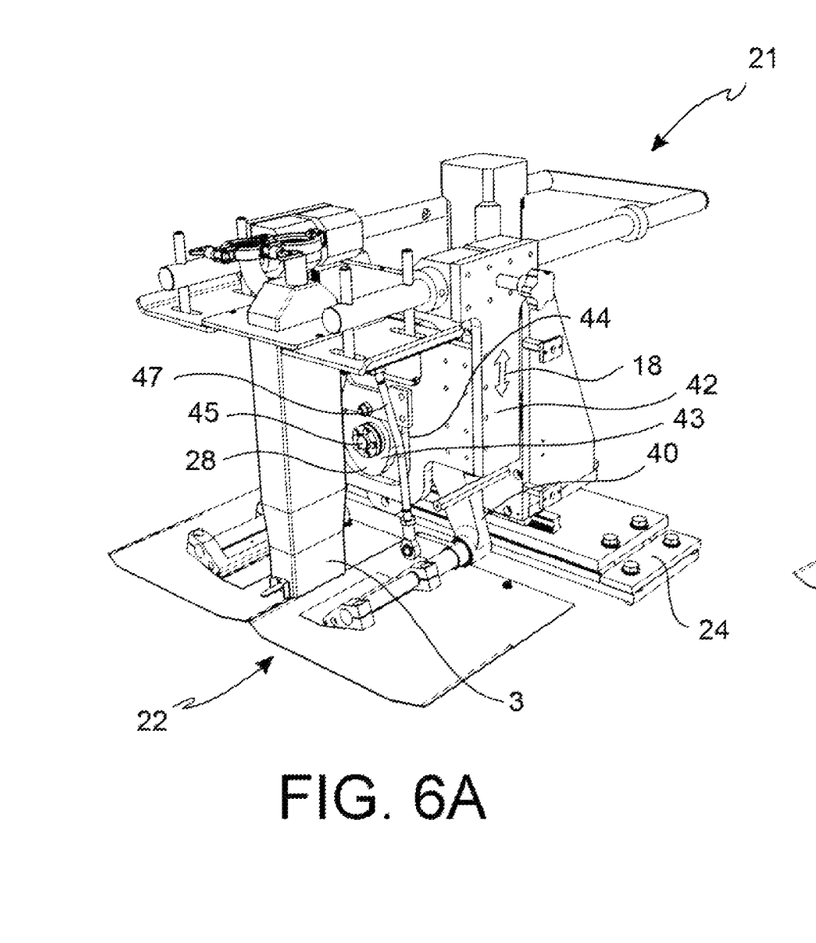
FIGS. 6A and 6B show the machine in FIG. 3 during two different operating steps.
Figure 6B:
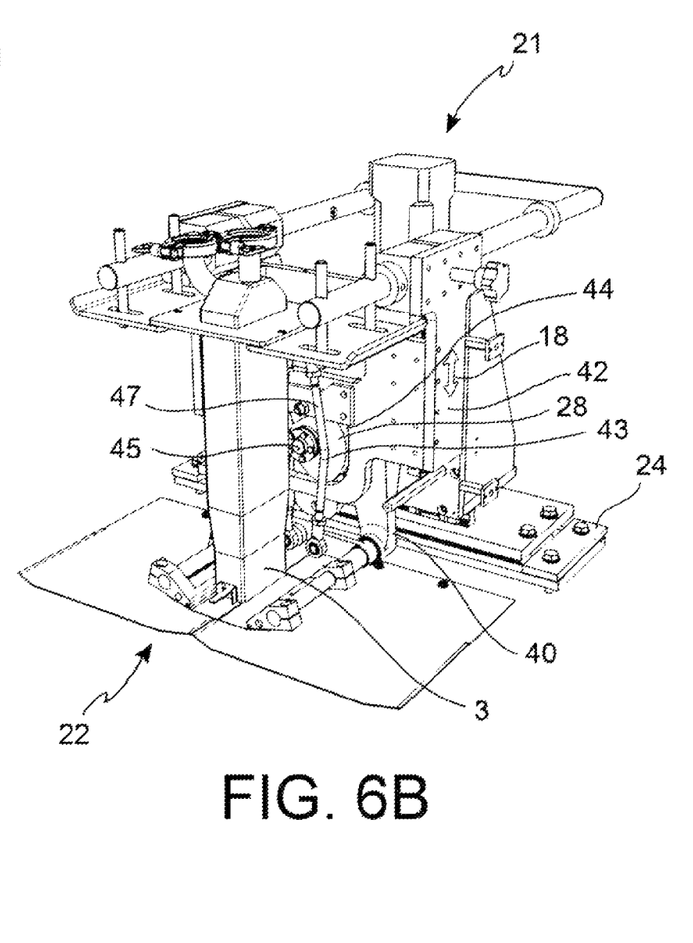

The lifting driving means 28 (FIGS. 6A, 6B) may include a lifting carriage 42 slidably supported on vertical lifting rails 43 of the follow-through carriage 32 and alternatingly movable along the lifting rails 43 by means of a lifting cam 43 connected to the shaft of the driving motor 36 and which engages a cam-follower track 44 formed in the lifting carriage 42. The extruder nozzle 3 (but not also the cutting means 6) is connected to lifting carriage 42 for moving together with it.

In this way, the shaft of the driving motor 36 carries out the aforementioned mechanical coupling 45 between the follow-through, cutting and lifting movements.

The detachment driving means 26 may include a linear actuator 46, for example a pneumatic actuator, controlled by the same control unit 30 which also controls the driving motor 36, and connected by means of two tie rods 47 to blades 6', 6" hinged to levers 37, in such a way as to rotate blades 6', 6" upwards and downwards (detachment displacement 4).

According to an embodiment, the machine may further comprise heating means 29 for a controlled heating of the cutting means 6 to facilitate cutting of the confectionary string 2. The heating means 29 may include one or more electrical heating resistors placed in the blades or integrated in the stretched wires and, possibly, a thermal sensor arranged to at least one of the two opposite blades and connected to the electronic control unit 30 which controls the power supply to the heating resistance in response to the temperature signal received from the sensor.

According to an embodiment, the machine 1 comprises cooling means 31, for example an electric refrigeration unit with a circuit for distribution of a cooling liquid, for cooling the conveying surface 8 and/or the environment in the extrusion and cutting zone as specified above in relation to the method. The cooling means 31 may be controlled by the control unit 30, too.

It is clear that, in order to meet specific and incidental needs, a man skilled in the art can make further changes and adjustments to the method and the machine for producing a confectionary product according to the present invention, all falling within the scope of protection of the invention as defined in the following claims.

The invention claimed is:

1. Method for producing a confectionary product, comprising the steps of:
   forming a confectionary string by extruding a confectionary substance through an extruder nozzle in an extrusion direction, and wherein the confectionary substance has a lower surface facing vertically downward while the confectionary substance is extruded through the extruder nozzle,
   forming the confectionary product by moving cutting means in a cutting direction transverse to the extrusion direction from a rest position outside the confectionary string to a cutting position inside the confectionary string in such a way as to separate by cutting an end portion from a remaining part of the confectionary string, such that the lower surface of the confectionary substance becomes a lower surface of the end portion,
   moving the confectionary product away from the extruder nozzle, by resting the lower surface of the end portion separated from the confectionary string on a conveying surface and moving the conveying surface in a transport direction transverse to the extrusion direction,
   resting the lower surface of the end portion on the conveying surface already before the separation of the end portion from the remaining part of the confectionary string and completing the separation of the end portion from the remaining part of the confectionary string while the lower surface of the end portion is resting on the conveying surface, wherein the end portion of the confectionary string is rigidly fixed to the conveying surface by freezing the lower surface of the end portion in a zone of contact between the lower surface of the end portion and the conveying surface before starting the cut,
   the extrusion direction is substantially vertical and the extrusion way is downwards, the conveying surface is substantially horizontal and orthogonal to the extrusion direction and extending below the extruder nozzle,
   at least in the zone where the forming and cutting of the confectionary string are carried out, the transport direction is substantially horizontal, and
   the cutting direction is substantially perpendicular to the extrusion direction and parallel to the conveying surface in the zone of forming and cutting the confectionary string.

2. Method according to claim 1, wherein the end portion of the confectionary string is rested on the conveying surface already before the cutting means penetrate into the confectionary string.

3. Method according to claim 1, comprising carrying out the rigid fixing by freezing by cooling the conveying surface.

4. Method according to claim 1, comprising:
   after the separation of the end portion from the remaining part of the confectionary string,
   moving the extruder nozzle away from the confectionary product formed and from the cutting means through a lifting movement of the extruder nozzle from a lower position to an upper position in a lifting direction parallel to the extrusion direction but in a way opposite to the extrusion way, in such a way as to create, below the cutting means, a free interstice space between a free end of the remaining part of the confectionary string and the confectionary product formed.

5. Method according to claim 1, wherein, after the separation of the end portion from the remaining part of the confectionary string, the cutting means are moved away from the confectionary product by:
   a displacement of the cutting means in the cutting direction from the cutting position to the rest position, and
   a displacement of the cutting means from a lowered position to a raised position along a detachment direction and in a way opposite to the extrusion way, in such a way as to create a free interstice space below the cutting means which allows the removal of the confectionary product in the transport direction.

6. Method according to claim 1, wherein:
   during the formation of the confectionary string, the conveying surface is moved in the transport direction, and
   since when the end portion of the confectionary string is rested up to the completion of the separation of the end portion from the remaining part of the confectionary string, the extruder nozzle and the cutting means are moved in a manner synchronized with the conveying surface from an initial position to a final position in a follow-through direction parallel to the transport direction.

* * * * *